United States Patent
Park et al.

(10) Patent No.: US 11,635,319 B2
(45) Date of Patent: *Apr. 25, 2023

(54) DEVICE AND METHOD FOR MONITORING LIQUID LEVEL OF LIQUID STORAGE TANKS FOR VEHICLE

(71) Applicants: Hyundai Motor Company, Seoul (KR); Kia Corporation, Seoul (KR); Omron Automotive Electronics Korea Co., Ltd., Gyeonggi-do (KR)

(72) Inventors: Jong Min Park, Seoul (KR); Nak Kyoung Kong, Gyeonggi-do (KR); Seung Hyeok Chang, Gyeonggi-do (KR); Ki Hong Lee, Seoul (KR); Young Sun Seo, Seoul (KR)

(73) Assignees: Hyundai Motor Company, Seoul (KR); Kia Corporation, Seoul (KR); Omron Automotive Electronics Korea Co., Ltd., Anseong (KR)

( * ) Notice: Subject to any disclaimer, the term of this patent is extended or adjusted under 35 U.S.C. 154(b) by 41 days.

This patent is subject to a terminal disclaimer.

(21) Appl. No.: 17/241,231

(22) Filed: Apr. 27, 2021

(65) Prior Publication Data

US 2021/0247225 A1 Aug. 12, 2021

Related U.S. Application Data

(62) Division of application No. 16/189,510, filed on Nov. 13, 2018, now Pat. No. 11,009,384.

(30) Foreign Application Priority Data

Jun. 12, 2018 (KR) ........................ 10-2018-0067295

(51) Int. Cl.
*G01F 23/263* (2022.01)

(52) U.S. Cl.
CPC .......... *G01F 23/268* (2013.01); *G01F 23/263* (2013.01); *G01F 23/266* (2013.01)

(58) Field of Classification Search
CPC ................. G01F 23/26–268; G01F 23/24–248
See application file for complete search history.

(56) References Cited

U.S. PATENT DOCUMENTS

| | | | |
|---|---|---|---|
| 10,282,046 B2 | 5/2019 | Nathan et al. | |
| 10,422,681 B2 | 9/2019 | Rondano et al. | |
| 10,773,743 B2 | 9/2020 | Park et al. | |
| 2005/0280424 A1 | 12/2005 | Qu et al. | |
| 2017/0184436 A1* | 6/2017 | Aigner | G01F 25/20 |

FOREIGN PATENT DOCUMENTS

| | | |
|---|---|---|
| CN | 1794399 A | 6/2006 |
| CN | 103754979 A | 4/2014 |
| CN | 105229467 A | 1/2016 |
| CN | 105358979 A | 2/2016 |
| KR | 10-2011-0024368 A | 3/2011 |
| WO | 2015/181770 A2 | 12/2015 |

* cited by examiner

*Primary Examiner* — Justin N Olamit
(74) *Attorney, Agent, or Firm* — Fox Rothschild LLP

(57) ABSTRACT

A device for monitoring a liquid level of a liquid storage tank for a vehicle is capable of improving sensing sensitivity of a liquid level sensor by employing a structure capable of amplifying an electromotive force, which is generated by an electrode, at an electromotive force amplification layer including a carbon micro coil (CMC) and accurately sensing a frozen state of a liquid to perform a heating function so as to resolve the frozen state of the liquid.

5 Claims, 16 Drawing Sheets

(a)

(b)

(c)

(a)

(b)

(c)

- SENSING LIQUID LEVEL ACCORDING TO VARIANCE IN PERMITTIVITY -

- SENSING PRESENCE OR ABSENCE OF LIQUID -

CONVENTIONAL CAPACITIVE SENSOR

CMC CAPACITIVE SENSOR OF PRESENT INVENTION
: CMC AMPLIFICATION EFFECT

CONVENTIONAL CAPACITIVE SENSOR

CMC CAPACITIVE SENSOR OF PRESENT INVENTION
: CMC AMPLIFICATION EFFECT

DEVICE AND METHOD FOR MONITORING LIQUID LEVEL OF LIQUID STORAGE TANKS FOR VEHICLE

CROSS-REFERENCE TO RELATED APPLICATION

This application is a Divisional Application of U.S. application Ser. No. 16/189,510, filed Nov. 13, 2018, which claims under 35 U.S.C. § 119(a) the benefit of Korean Patent Application No. 10-2018-0067295 filed on Jun. 12, 2018, the entire contents of which are incorporated herein by reference.

BACKGROUND

(a) Technical Field

The present disclosure relates to a device for monitoring a liquid level of a liquid storage tank for a vehicle, more particularly, to the device for monitoring the liquid level of the liquid storage tank that is capable of accurately sensing a liquid level of a liquid stored in the liquid storage tank and inducing the liquid to be heated by monitoring a frozen state of the liquid.

(b) Description of the Related Art

Various different types of liquids, such as fuel for driving an engine, washer fluid, brake fluid, and the like, are used in a vehicle, and the need to change or replenish the various liquids varies.

In order to change or replenish a liquid, a method for sensing a liquid level due to liquid consumption is used.

Methods for sensing a liquid level of a liquid include a method for sensing a liquid level using a rod (block) having buoyancy, a method for sensing a liquid level using an electrode rod, a method for sensing a liquid level using a reed switch, a method for sensing a liquid level using capacitive displacement, and the like.

The method for sensing a liquid level using buoyancy is a common method, and as shown in FIG. 1 (PRIOR ART), a liquid level is sensed using a variable resistor in which contact of a resistor 3 is varied caused by movement of a buoyancy rod 2 according to variation in liquid level in a state in which the buoyancy rod 2 is installed to be capable of being in contact with the resistor 3 in a liquid storage tank 1.

As shown in FIG. 2 (PRIOR ART), the method for sensing a liquid level using an electrode rod is such that, when a voltage is applied to a pair of electrode rods 4 in a state in which the electrode rods 4 are disposed to be spaced apart from each other at predetermined positions of the liquid storage tank 1, a liquid level is sensed on the basis of current flowing between the electrode rods 4 via a liquid (conductivity).

The method for sensing a liquid level using capacitive displacement is roughly classified into a method for sensing a liquid level using a rod and a method for sensing a liquid level using electrodes, and as shown in FIG. 3 (PRIOR ART), the method for sensing a liquid level using a rod is such that a liquid level is sensed using a characteristic in which capacitance is varied according to a variation in liquid level in contact with a rod 5 in a state in which the rod 5 is inserted into the liquid storage tank 1, and as shown in FIG. 4 (PRIOR ART), the method for sensing a liquid level using electrodes is such that a liquid level is sensed using a characteristic in which capacitance is varied in a non-contact state in which a pad-shaped single electrode 6 or multiple electrodes 7 are not in direct contact with a liquid by attaching the pad-shaped single electrode 6 or the multiple electrodes 7 to an outer surface of the liquid storage tank 1.

However, the above-described conventional methods for sensing a liquid level have the same problem in that a liquid level cannot be accurately sensed when a liquid in a liquid storage tank is frozen.

The above information disclosed in this Background section is only for enhancement of understanding of the background of the invention and therefore it may contain information that does not form the prior art that is already known in this country to a person of ordinary skill in the art.

SUMMARY

It is an object of the present invention to provide a device for monitoring a liquid level of a liquid storage tank for a vehicle, which is capable of improving sensing sensitivity of a liquid level sensor by employing a structure capable of amplifying an electromotive force, which is generated by an electrode, at an electromotive force amplification layer including a carbon micro coil (CMC) and accurately sensing a frozen state of a liquid to perform a heating function of resolving the frozen state of (i.e., unfreezing) the liquid.

In one aspect, the present invention provides a device for monitoring a liquid level of a liquid storage tank for a vehicle, the device including a liquid level sensor including an electrode and an electromotive force amplification layer coated on one surface of the electrode configured to amplify an electromotive force generated by the electrode, the liquid level sensor being installed inside or outside the liquid storage tank, a signal converter configured to convert a sensed value of the liquid level sensor into a desired value, and a controller configured to receive a signal of the signal converter and output the received signal in a displayable form, wherein the electromotive force amplification layer is formed by mixing a plurality of CMCs with an insulating paste and is conductively coated on one surface of the electrode.

In another aspect, the present invention provides a method for monitoring a liquid level of a liquid storage tank for a vehicle, the method including sensing, by a liquid level sensor in which an electromotive force amplification layer is coated on one surface of an electrode, the liquid level of a liquid in a state in which the liquid level sensor is installed inside or outside the liquid storage tank, determining whether a sensed value sensed by the liquid level sensor is a normal value for sensing the liquid level of the liquid in a liquid state or an abnormal value for sensing the liquid level of the liquid in a frozen state, and when the sensed value sensed by the liquid level sensor is determined as being the abnormal value, driving, by a controller, a heating device for resolving a freezing of the liquid, and when the sensed value sensed by the liquid level sensor is determined as being the normal value after the driving of the heating device, interrupting the driving of the heating device.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
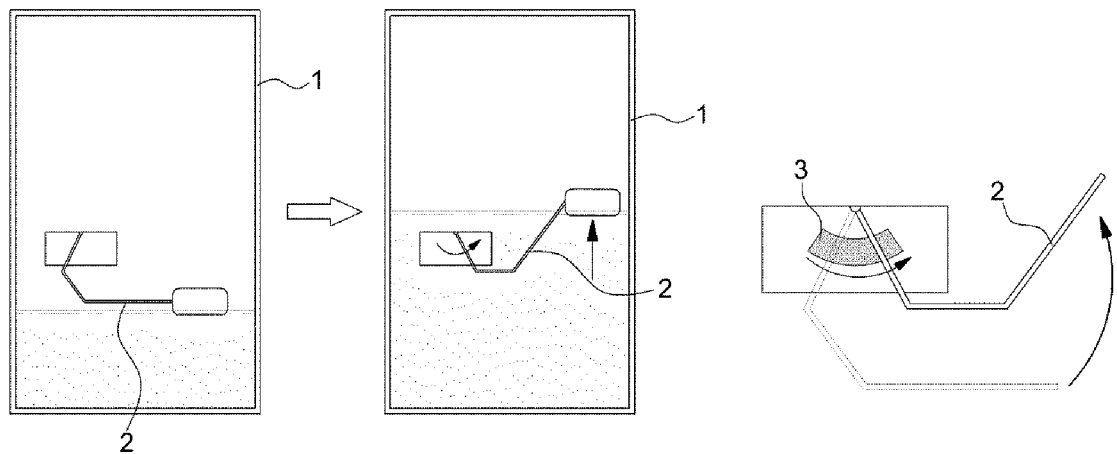
FIGS. 1 to 4 (PRIOR ART) are schematic diagrams illustrating a conventional method for sensing a liquid level.
Figure 2:
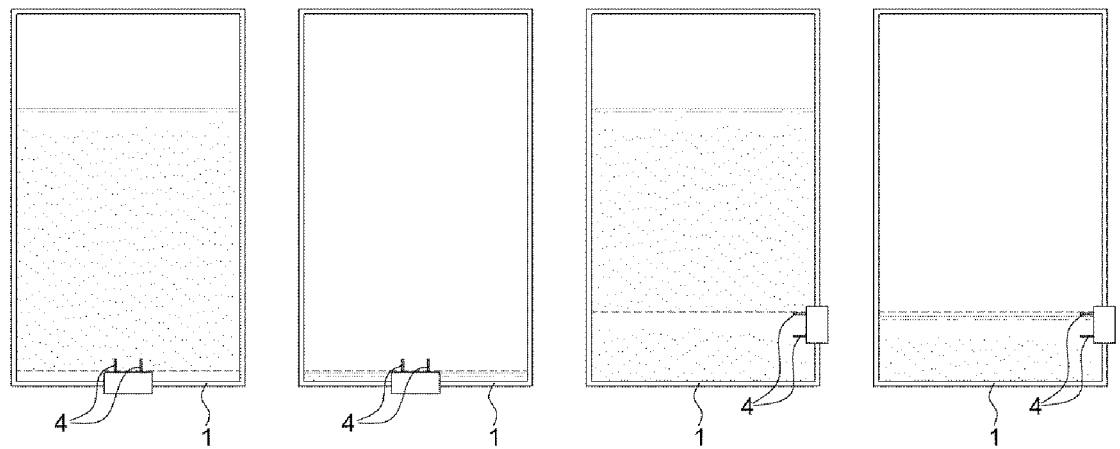
Figure 3:
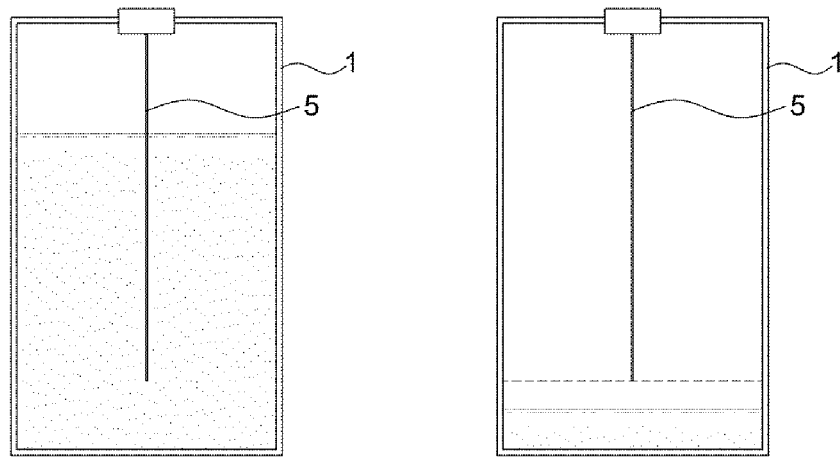
Figure 4:
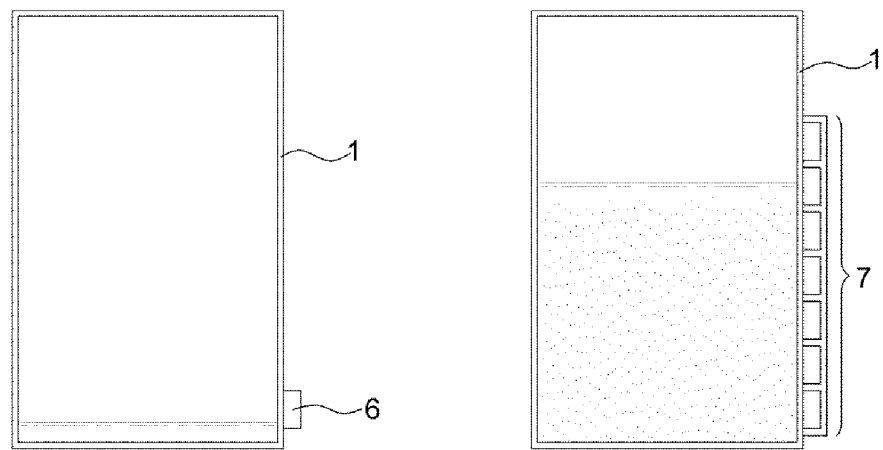

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings.

Figure 5:
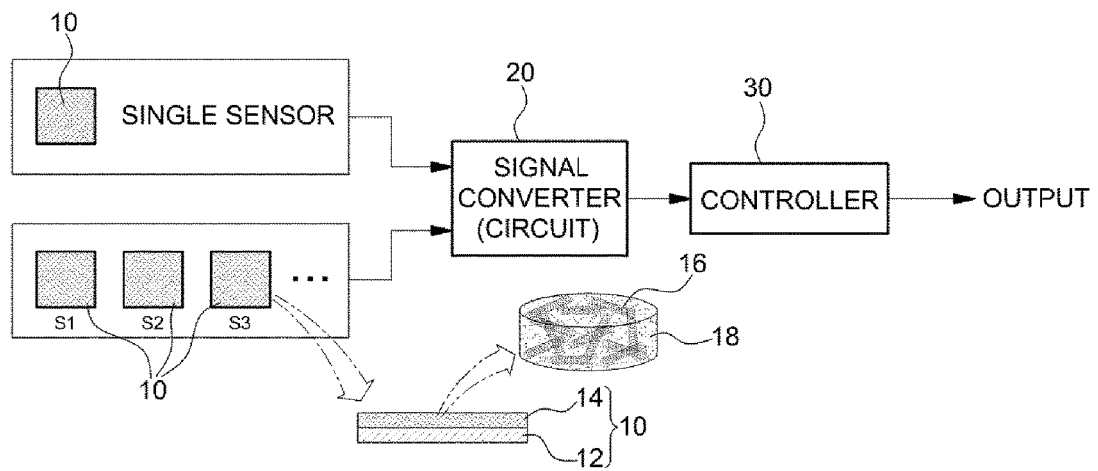
FIG. 5 is a block diagram illustrating a device for monitoring a liquid level of a liquid storage tank for a vehicle according to the present invention.

FIG. 5 illustrates a device for monitoring a liquid level of a liquid storage tank for a vehicle according to the present invention, and reference numeral 10 denotes a liquid level sensor which is a type of capacitive sensor for sensing a liquid level.

A structure and a sensing method of the liquid level sensor are altered according to measurement of a liquid level of what kind of liquid in the vehicle, but the liquid level sensor of the present invention is basically configured with a capacitive-type sensor including a carbon micro coil (CMC) or a carbon nano coil (CNC).

To this end, the liquid level sensor 10 according to the present invention is configured in a structure having an electromotive force amplification layer 14, in which a CMC 16 and a paste 18 are mixed, that is coated on one surface of an electrode 12 with a predetermined thickness.

That is, the liquid level sensor 10 is configured with the electrode 12 forming capacitance, and the electromotive force amplification layer 14 coated on one surface of the electrode 12 and configured to amplify an electromotive force generated by the electrode 12. In particular, the electromotive force amplification layer 14 is made of a mixture of the insulating paste 18 and a plurality of CMCs 16 serving to amplify the electromotive force generated by the electrode 12 and is coated on one surface of the electrode 12.

Figure 6:
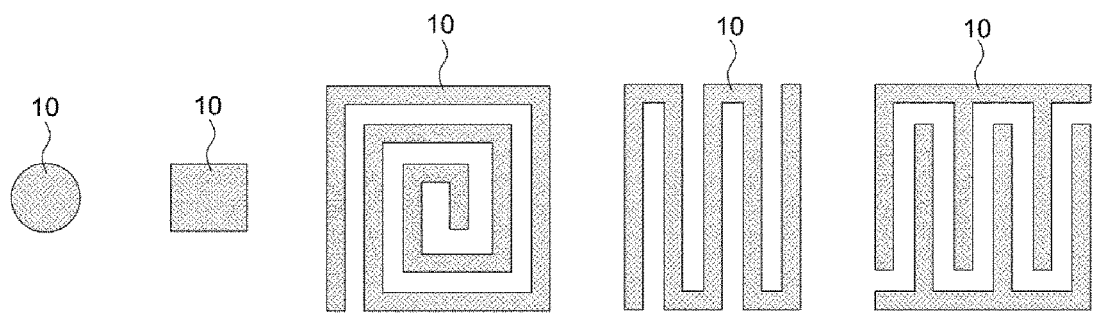
FIG. 6 is a plan view illustrating a liquid level sensor according to the present invention.

In this case, as shown in FIG. 6, a planar shape of the liquid level sensor 10 may be formed in various shapes capable of generating an electromotive force, such as a circular or quadrangular pad, an antenna shape, a zigzag shape, a comb shape, and the like.

Preferably, the liquid level sensor 10 having the electrode 12 and the electromotive force amplification layer 14 may be provided as a single sensor or a plurality of sensors which are divided into a plurality of channels.

Meanwhile, the device for monitoring a liquid level according to the present invention includes a signal converter 20 for converting a sensed value of the liquid level sensor 10 in the form of a desired value, and a controller 30 for receiving the converted desired value of the signal converter 20 and outputting the converted desired value in the form of a signal which is displayable on a display and the like.

Figure 7:
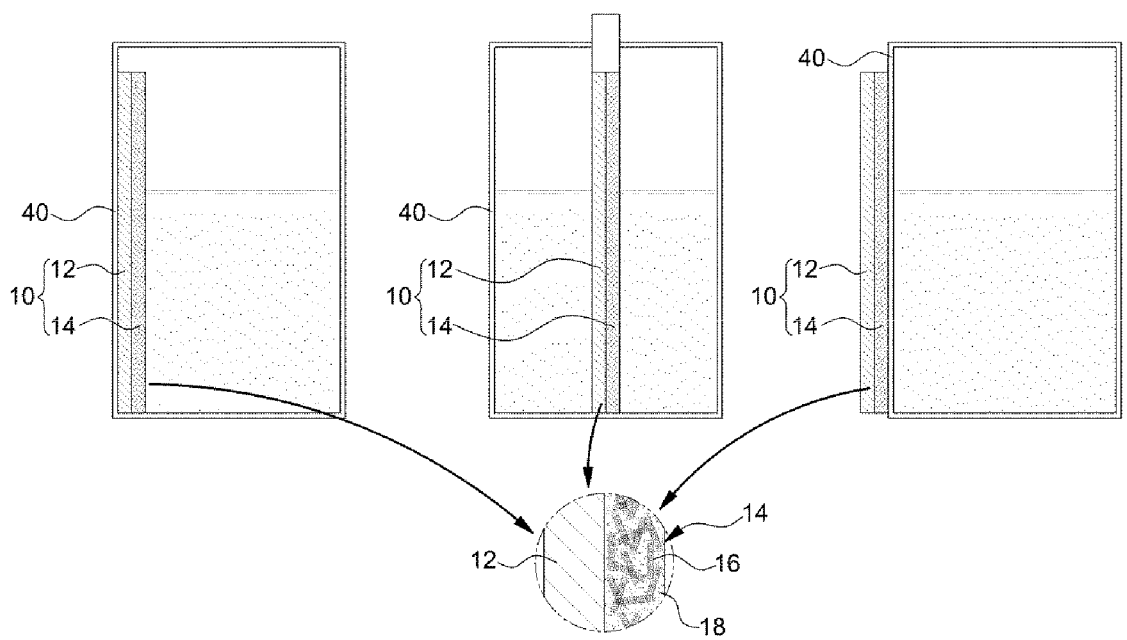
FIG. 7 is a schematic diagram illustrating an installation method of the liquid level sensor according to the present invention.

As shown in FIG. 7, the above-described liquid level sensor 10 may be installed at a position capable of sensing a liquid level of a liquid storage tank 40, and for example, the liquid level sensor 10 may be installed at an inner wall or an outer wall of the liquid storage tank 40 through a conventional adhesive or may be inserted and disposed inside the liquid storage tank 40.

When the liquid level sensor 10 according to the present invention is installed inside the liquid storage tank 40, the electrode 12 is in close contact with the inner wall of the liquid storage tank 40 and, simultaneously, is in a state of being covered and protected by the paste 18 of the electromotive force amplification layer 14.

Preferably, when the liquid level sensor 10 according to the present invention is installed inside the liquid storage tank 40, the electromotive force amplification layer 14 coated on one surface of the electrode 12 is in direct contact with a liquid instead of the electrode 12 so that the paste 18 of the electromotive force amplification layer 14 serves to protect the CMC 16 from the liquid and, simultaneously, serves to protect the electrode 12 from the liquid such that oxidation of the electrode 12, which is caused by a direct contact of the electrode 12 to the liquid, may be prevented to prolong the lifetime of the electrode 12.

Preferably, the liquid level sensor 10 may be modularized with a printed circuit board (PCB) including circuit components, which constitute the signal converter 20 and the controller 30, to be installed inside or outside the liquid storage tank 40.

Figure 8:
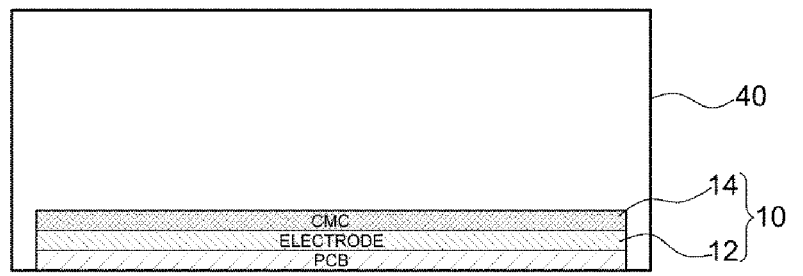
FIG. 8 is a schematic diagram illustrating an example in which the liquid level sensor according to the present invention is installed inside the liquid storage tank.
Figure 8:
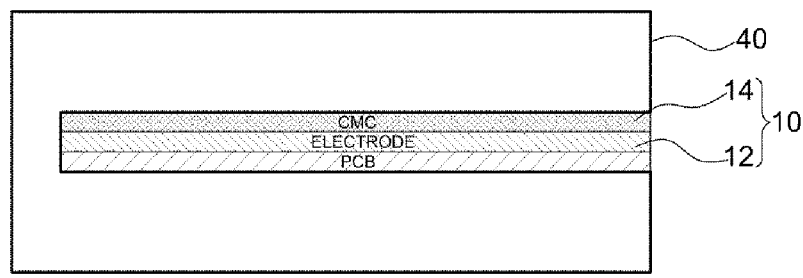
Figure 8:
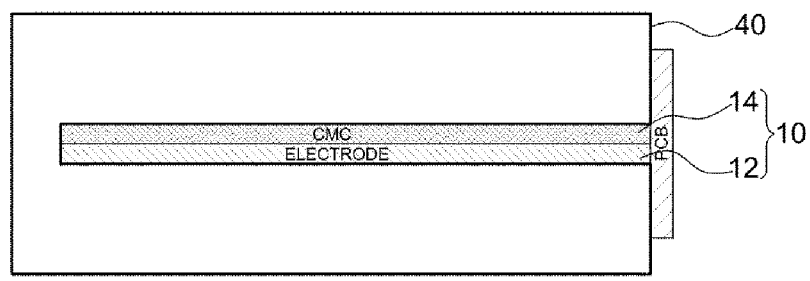

Preferably, as shown in FIG. 8A, when the liquid level sensor 10 is installed inside the liquid storage tank 40, a substrate (PCB) may be stacked on and attached to the liquid level sensor 10 configured with the electrode 12 and the electromotive force amplification layer 14, and then the liquid level sensor 10 may be installed at the inner wall of the liquid storage tank 40. Alternatively, as shown in FIG. 8B, the substrate (PCB) may be stacked on and attached to the liquid level sensor 10 configured with the electrode 12 and the electromotive force amplification layer 14, and then the liquid level sensor 10 may be installed by being inserted into a hole formed at the liquid storage tank 40. Alternatively, as shown in FIG. 8C, only the liquid level sensor 10 configured with the electrode 12 and the electromotive force amplification layer 14 may be inserted into the liquid storage tank 40, and the substrate (PCB) may be connected in a signal-exchangeable manner to the liquid level sensor 10 so that the liquid level sensor 10 may be disposed outside the liquid storage tank 40.

Figure 9:
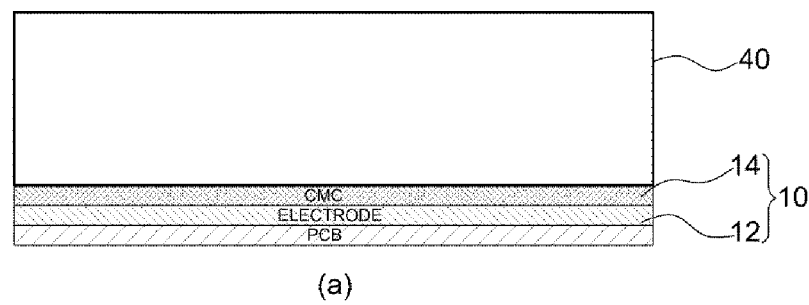
FIG. 9 is a schematic diagram illustrating an example in which the liquid level sensor according to the present invention is installed outside the liquid storage tank.
Figure 9:
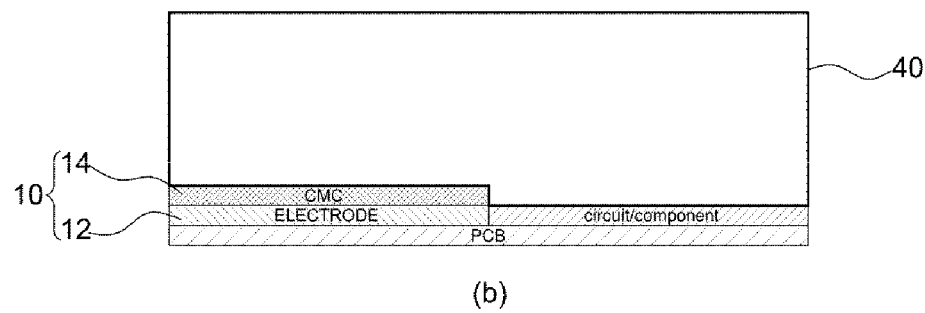
Figure 9:
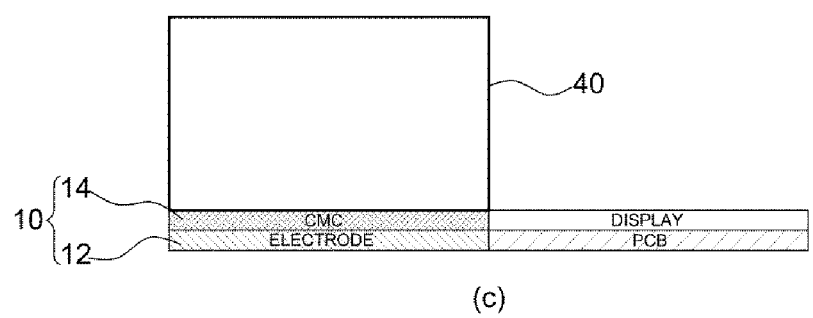

Further, as shown in FIG. 9A, when the liquid level sensor 10 is installed outside the liquid storage tank 40, the substrate (PCB) may be stacked on and attached to the liquid level sensor 10 including the electrode 12 and the electromotive force amplification layer 14, and then the liquid level sensor 10 may be installed at the outer wall of the liquid storage tank 40 through molding, fusing, or the like. Alternatively, as shown in FIG. 9B, the liquid level sensor 10 configured with the electrode 12 and the electromotive force amplification layer 14 may be installed at a portion of an outer surface of the liquid storage tank 40 as well as a substrate (PCB) having a larger area may be stacked on and attached to an outer surface of the liquid level sensor 10. Alternatively, as shown in FIG. 9C, the liquid level sensor 10 configured with the electrode 12 and the electromotive force amplification layer 14 may be attached to the outer surface of the liquid storage tank 40 as well as a substrate (PCB) may be modularized with a display and may be disposed at a side portion of the liquid level sensor 10.

Meanwhile, the liquid level sensor 10 is a type of capacitance-type sensor, variances in permittivity and capacitance value with respect to a liquid vary according to a size or shape of the electrode 12, and further the variances in permittivity and capacitance value vary according to a variety of liquid.

Figure 10A:
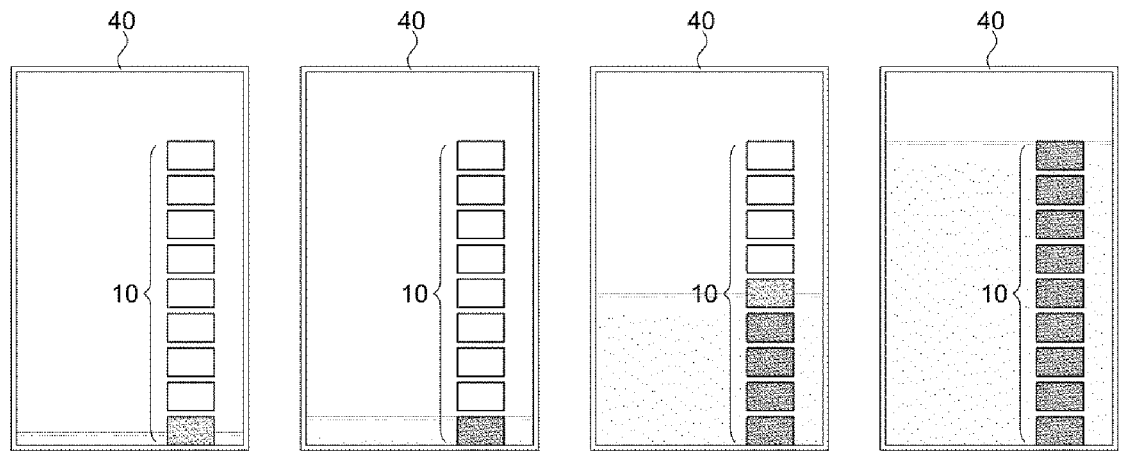
FIGS. 10A and 10B are schematic diagrams illustrating a sensing characteristic of the liquid level sensor according to the present invention.
Figure 10B:
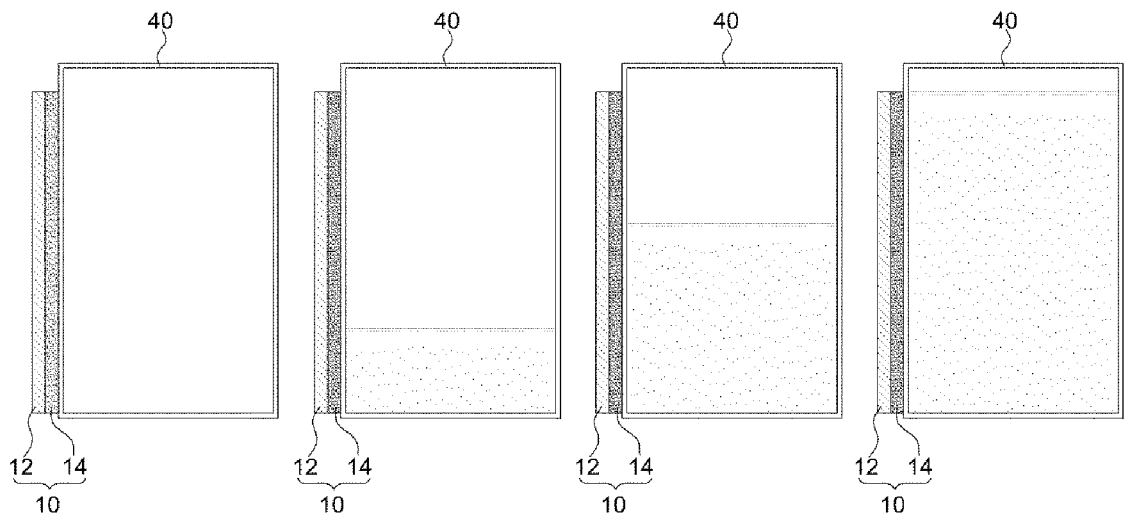

The liquid level sensor 10 according to the present invention can perform at least two functions: (1) sensing a water level on the basis of a variance in permittivity of water according to the water level (see FIG. 10A), and (2) sensing the presence of water in the liquid storage tank 40 (see FIG. 10B).

According to such sensing characteristics of the liquid level sensor 10, a single capacitive sensor or a plurality of capacitive sensors may be used as the liquid level sensor 10, and further the liquid level sensor 10 may be manufactured and used in various sizes and shapes according to the usage such as precision measurement, simplified measurement, and structural specific measurement.

Alternatively, the liquid level sensor 10 according to the present invention may employ any shape of electrode capable of generating an electromotive force, but in order to improve sensing performance, the liquid level sensor 10 should be configured to include the electromotive force amplification layer 14 having the CMC 16 as described above.

Meanwhile, as in a basic operation of a conventional capacitive sensor, the liquid level sensor 10 according to the present invention is a capacitance type sensor in which a current flows in an electrode to generate an electromotive force, and senses variance in electromotive force when an object approaches the sensor.

Figure 11A:
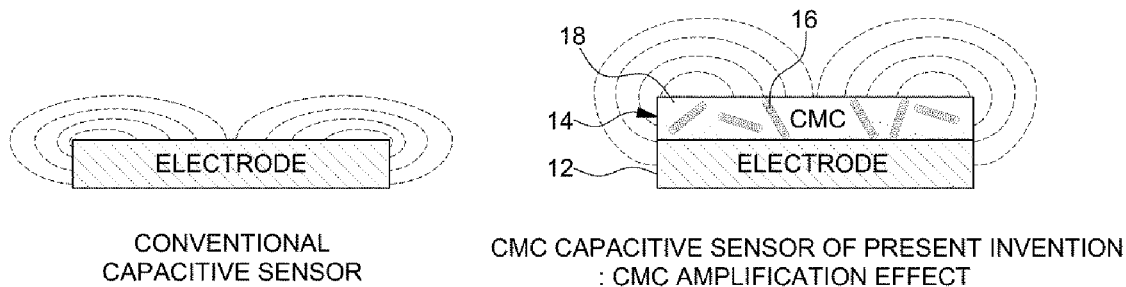
FIGS. 11A and 11B are schematic diagrams illustrating an amplification effect of the liquid level sensor according to the present invention.
Figure 11B:
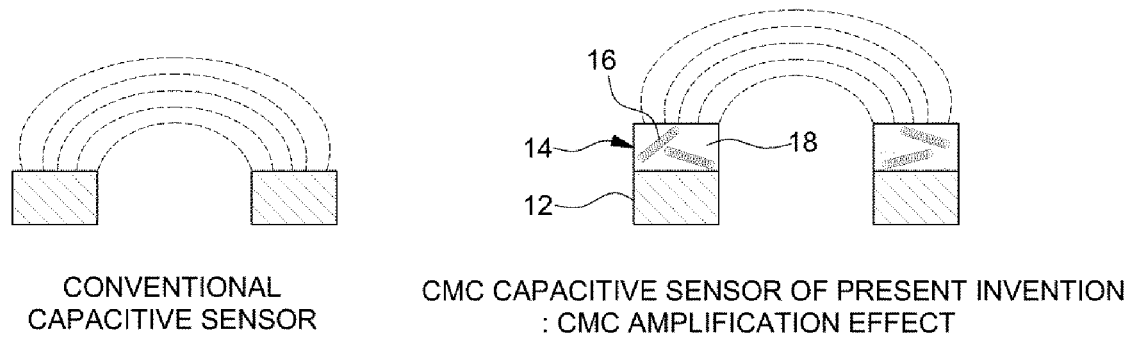

However, referring to FIGS. 11A and 11B, since the liquid level sensor 10 according to the present invention includes the electromotive force amplification layer 14, in which the CMC 16 and the paste 18 are mixed, in addition to the electrode 12 in comparison with the conventional capacitive sensor, an electromotive force generated by the electrode 12 is amplified (practically, the electromotive force is amplified by the CMC 16) such that sensing sensitivity may be improved.

Further, the liquid level sensor 10 according to the present invention includes a plurality of sensors, and is installed inside or outside the liquid storage tank 40 at regular intervals along a height direction such that accuracy of a liquid level sensing may be improved.

Figure 12:
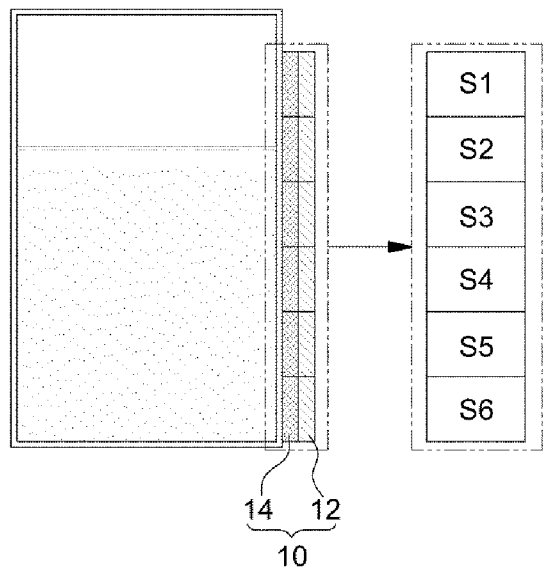
FIG. 12 is a schematic diagram illustrating a structure for an accurate sensing of the liquid level sensor according to the present invention.

That is, as shown in FIG. 12, when the liquid level sensor 10 according to the present invention is installed at the liquid storage tank 40, a plurality of liquid level sensors S1 to Sn are installed at regular intervals in a row, a variation in capacitance is sensed by each of the plurality of liquid level sensors S1 to Sn, and a sensed value of each of the plurality of liquid level sensors S1 to Sn are verified such that more accurate and highly precise liquid level sensing performance may be provided.

Further, the liquid level sensor 10 according to the present invention may be used to perform a simplified sensing function (a low-cost sensor) for warning a liquid supplement by being installed at a low water level position of the liquid storage tank 40.

Figure 13:
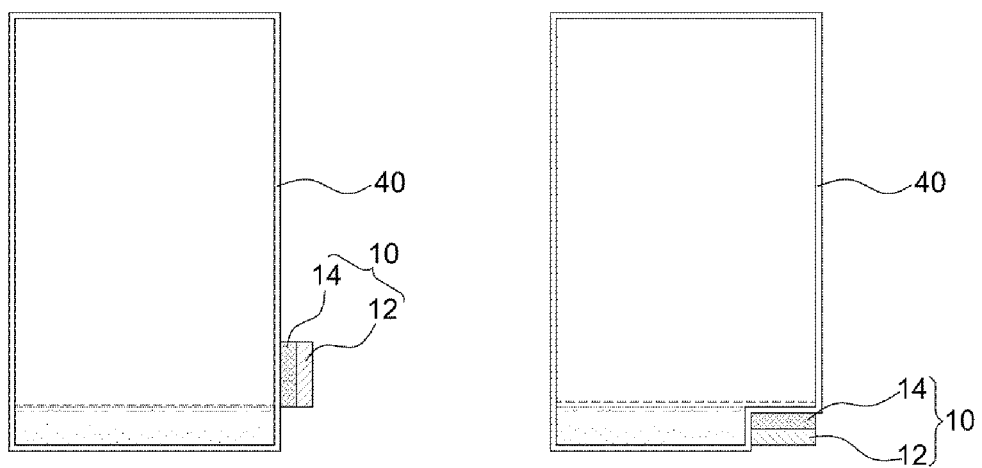
FIG. 13 is a schematic diagram illustrating a simplified sensing structure of the liquid level sensor according to the present invention.

For example, as shown in FIG. 13, the liquid level sensor 10 may be installed at a low water level reference position of the liquid storage tank 40 and may be used to warn a driver by sensing a liquid which reaches the low water level reference position.

Alternatively, the liquid level sensor 10 may be installed at a stepped level or a bent portion, which is formed at a bottom of the liquid storage tank 40, and may be used to warn the driver by sensing the liquid which reaches the low water level reference position.

Meanwhile, the liquid level sensor 10 according to the present invention is characterized in not only warning the driver of the liquid level through a display device by sensing the liquid level, but also allowing liquid heating control for detecting a frozen state of the liquid to resolve the frozen state, i.e., unfreeze the liquid.

Figure 14:
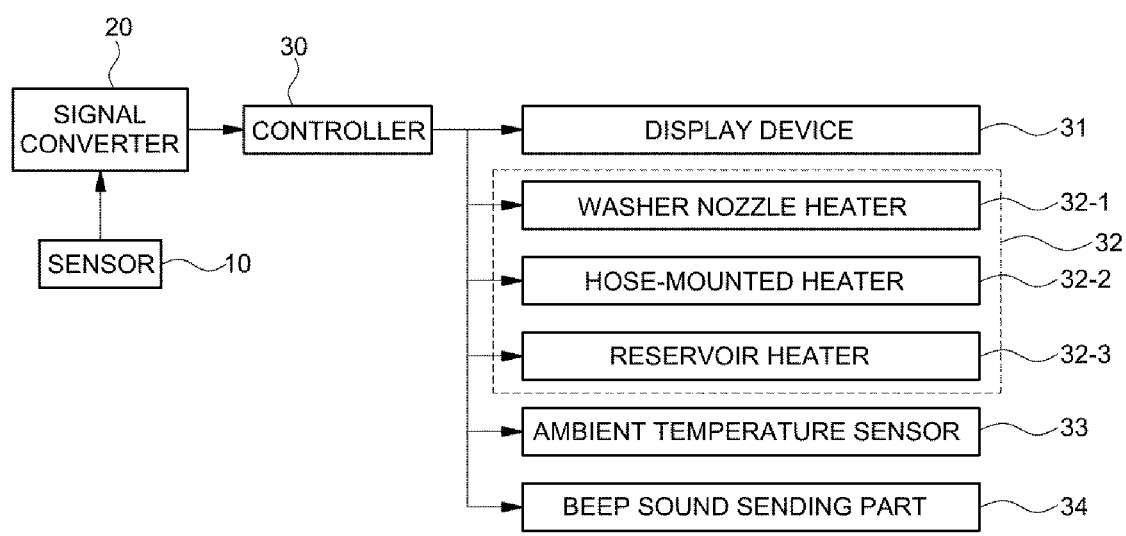
FIG. 14 is a block diagram illustrating a configuration for performing heating, which is further connected to the device for monitoring a liquid level according to the present invention.

To this end, as shown in FIG. 14, a display device 31 is connected to an output side of the controller 30 which receives a signal of the liquid level sensor 10 via the signal converter 20, and further an ambient temperature sensor 33 as well as a heating device 32 capable of melting a frozen liquid in the liquid storage tank 40 are connected to the output side of the controller 30 to allow a control signal to be transmitted.

For example, when the controller 30 receives a signal indicating a frozen state of the liquid from the liquid level sensor 10, the controller 30 transmits a signal to the display device 31 and a beep sound sending part 34 to warn the driver and, simultaneously, transmits a driving signal to the heating device 32 which is capable of melting the liquid and includes a washer nozzle heater 32-1, a hose-mounted heater 32-2, and a reservoir heater 32-3.

Hereinafter, a configuration for sensing a frozen state of a liquid in the liquid level sensor 10 according to the present invention will be described.

One of most significant problems in operation of the liquid level sensor 10 occurs when the liquid level sensor 10 is used with a liquid that is frozen, and when a frozen state of the liquid is maintained, the liquid cannot be discharged to a desired place of use, and further a failure of the liquid level sensor 10 is caused by the frozen state of the liquid.

In this case, since a capacitive sensor senses a variance in permittivity of the liquid, the capacitive sensor may determine a freezing of the liquid on the basis of different dielectric constants of water and ice, but the conventional capacitive sensor cannot determine the frozen state of the liquid for at least the following reasons.

Figure 16A:
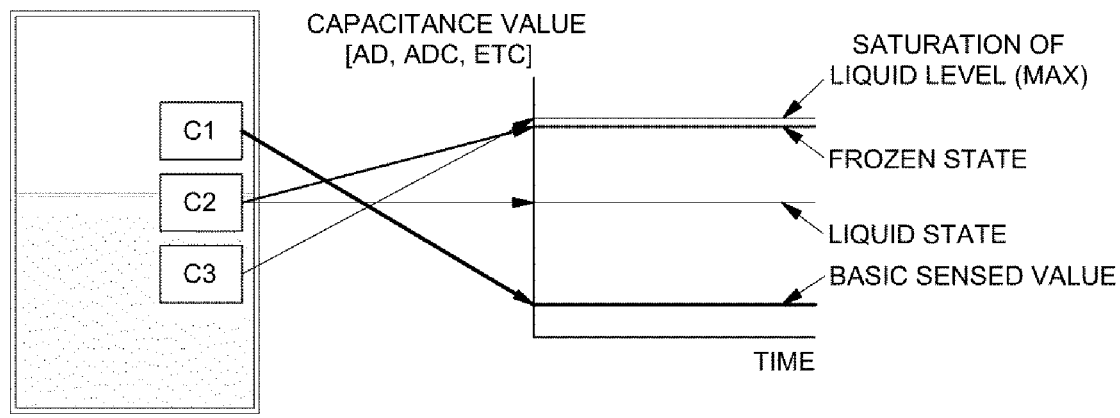
FIGS. 16A and 16B are graphs showing examples in which a conventional capacitive sensor outputs different sensed values when detecting a liquid (water) and ice.

As shown in FIG. 16A, assuming that a variation in liquid level occurs in a state in which the conventional capacitive sensors C1, C2, and C3 are installed in the liquid storage tank 40, the capacitive sensor C1 is in a state of having a basic sensed value because a liquid level does not reach (arrive at) the capacitive sensor C1, thereby outputting the basic sensed value (see solid line in the graph of FIG. 16A).

Meanwhile, when the liquid level is located at an intermediate height of the capacitive sensor C2, the capacitive sensor C2 outputs some variation values (dotted lines in the graph of FIG. 16A) and does not output a maximum value (saturation of the liquid level).

However, when the liquid level is located at the intermediate height of the capacitive sensor C2 and the liquid is in a frozen state, since permittivity of ice is greater than that of the liquid (e.g., a permittivity ratio of the ice to the liquid (water) is 100 to 80), the capacitive sensor C2 outputs the maximum value (saturation of the liquid level) as a sensed value.

Alternatively, when the capacitive sensor C3 is immersed in the liquid, the capacitive sensor C2 outputs the maximum value (saturation of the liquid level) according to the variation in liquid level.

Thus, the conventional capacitive sensor determines the frozen state of the liquid only on the basis of a saturation state of the liquid level, and thus the conventional capacitive sensor cannot accurately sense a current frozen state of the liquid.

Figure 16B:
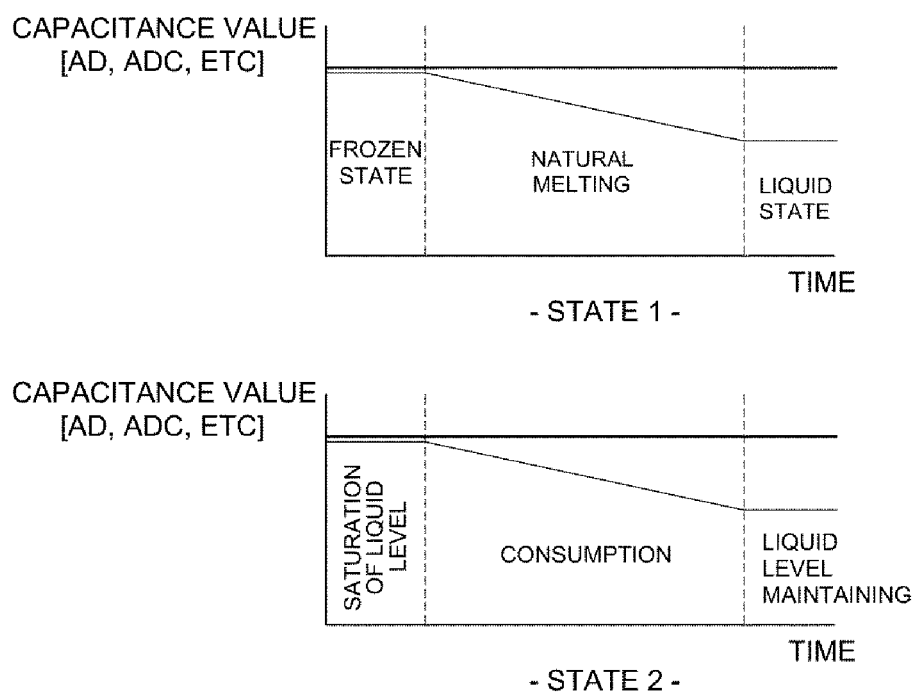

Further, referring to an upper graph of FIG. 16B, when the conventional capacitive sensor senses the maximum value (saturation of the liquid level) as an output value in the frozen state of the liquid and then the liquid is being unfrozen by a surrounding environment, the output value of the conventional capacitive sensor is gradually decreased, whereas referring to a lower graph of FIG. 16B, when a sensed value of the conventional capacitive sensor is an actual maximum value (saturation of the liquid level), the liquid level is lowered according to liquid consumption (e.g., fuel consumption) and, simultaneously, the sensed value of the conventional capacitive sensor is gradually decreased such that it cannot be accurately determined whether the conventional capacitive sensor outputs the sensed value in the frozen state.

In order to address such problems, the present invention is also characterized in that a difference in permittivity between a liquid state and a frozen state is used, the frozen state of the liquid may be accurately sensed through an arrangement structure of the liquid level sensor 10, and thus heating control for resolving a freezing of the liquid may be performed.

Figure 17:
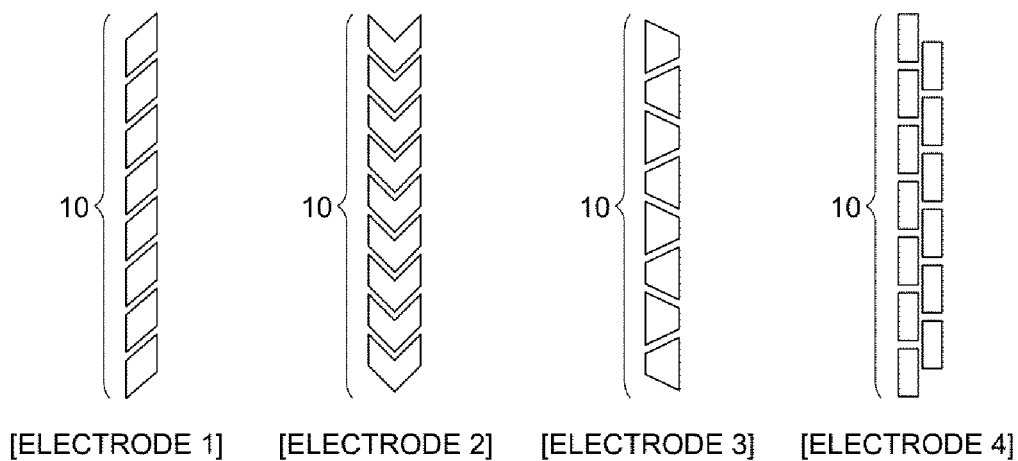
FIG. 17 is a schematic diagram illustrating an arrangement structure of the liquid level sensor according to the present invention.

To this end, the liquid level sensor 10 according to the present invention is divided into a plurality of sensors, each of which has a diagonal structure, disposed in a row along a vertical direction of the liquid storage tank 40 (see [Electrode 1] of FIG. 17). Alternatively, the liquid level sensor 10 is divided into a plurality of sensors, each of which has a V-shaped structure, disposed in a row along the vertical direction thereof (see [Electrode 2] of FIG. 17). As a further alternative, the liquid level sensor 10 is divided into a plurality of sensors, each of which has a trapezoidal polygonal structure, interdigitatedly disposed in a row along the vertical direction thereof (see [Electrode 3] of FIG. 17). As a yet further alternative, the liquid level sensor 10 is divided into a plurality of sensors, each of which has a rectangular structure, alternatively disposed in two rows along the vertical direction thereof (see [Electrode 4] of FIG. 17) such that the frozen state of the liquid may be accurately sensed.

Hereinafter, an operation for sensing a frozen state of a liquid in the liquid level sensor 10 according to the present invention will be described.

Figure 19:
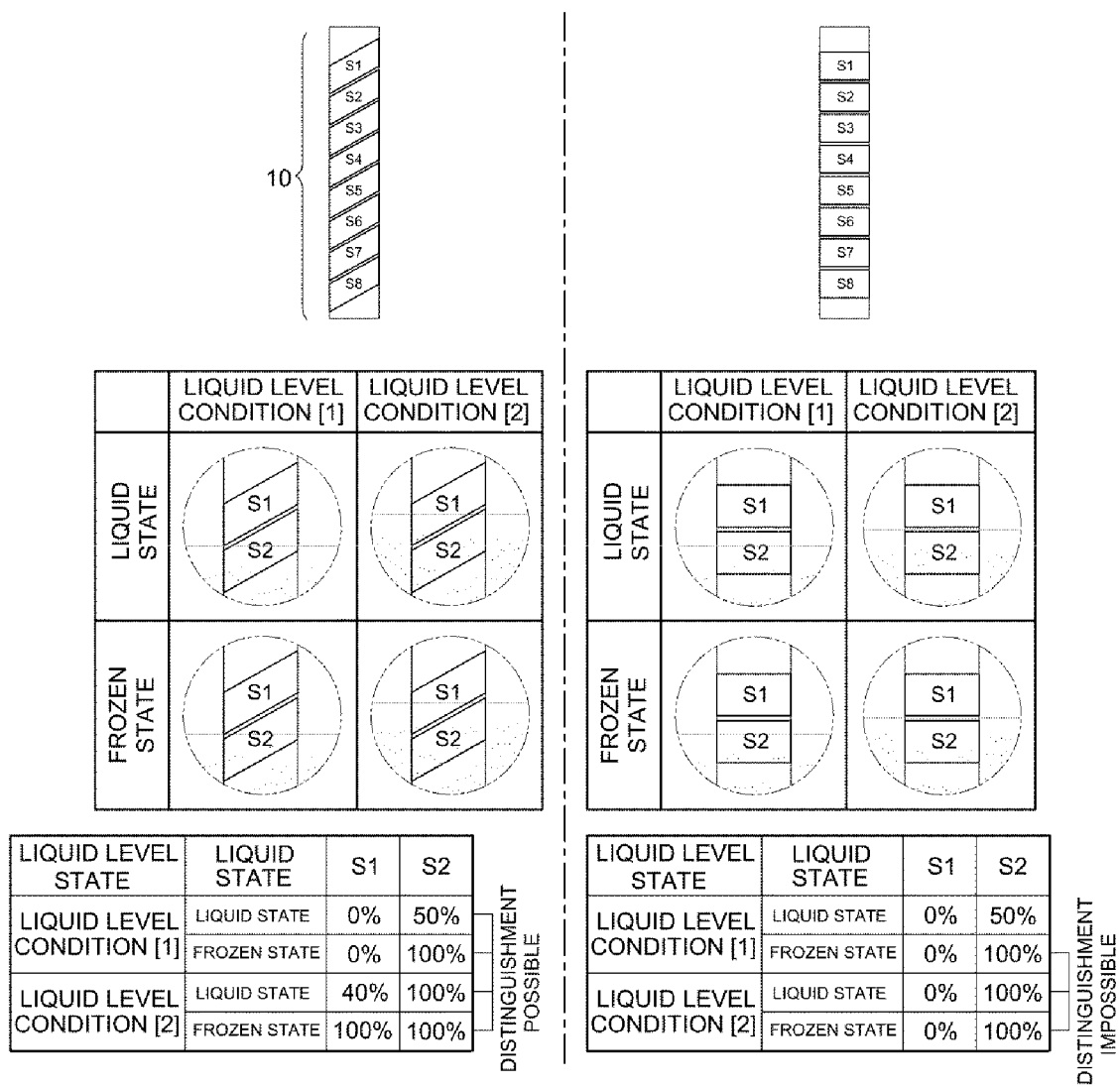
FIGS. 19 and 20 are diagrams illustrating the principle that the liquid level sensor according to the present invention senses a frozen state of a liquid.

FIG. 19 is a diagram comparing operations of sensing a frozen state of a liquid in a case in which the liquid level sensor 10 according to the present invention is divided into a plurality of sensors, each of which has a diagonal structure, installed in a row along the vertical direction of the liquid storage tank 40, and a case in which the liquid level sensor 10 according to the present invention is divided into a plurality of sensors, each of which has a simplified rectangular structure, disposed in two rows along the vertical direction of the liquid storage tank 40.

When the liquid level sensor 10 according to the present invention is divided into a plurality of sensors, each of which has a simplified rectangular shape, disposed in a row along the vertical direction of the liquid storage tank 40 (see a right drawing of FIG. 19), in a liquid level condition 1 (a state in which a first liquid level sensor S1 is not immersed into a liquid and a second liquid level sensor S2 is half-immersed in the liquid) and a state in which the liquid is not frozen, the first liquid level sensor S1 senses permittivity of the liquid as 0% and, simultaneously, the second liquid level sensor S2 senses the permittivity of the liquid as 50%.

At this point, in the liquid level condition 1 (the state in which the first liquid level sensor S1 is not immersed into a liquid and the second liquid level sensor S2 is half-immersed in the liquid) and a state in which the liquid is frozen, since permittivity of ice is relatively higher than that of the liquid (e.g., water), the first liquid level sensor S1 senses the permittivity of the liquid as 0% and, simultaneously, the second liquid level sensor S2 senses the permittivity of the liquid as 100%.

Further, when the liquid level sensor 10 according to the present invention is divided into a plurality of sensors, each of which has a simplified rectangular shape, disposed in a row along the vertical direction of the liquid storage tank 40, in a liquid level condition 2 (a state in which the first liquid level sensor S1 is not immersed into the liquid and the second liquid level sensor S2 is totally immersed in the liquid) and a state in which the liquid is not frozen, the first liquid level sensor S1 senses the permittivity of the liquid as 0% and, simultaneously, the second liquid level sensor S2 senses the permittivity of the liquid as 100% (saturation of a liquid level).

At this point, even in the liquid level condition 2 (the state in which the first liquid level sensor S1 is not immersed into the liquid and the second liquid level sensor S2 is totally immersed in the liquid) and the state in which the liquid is frozen, since the first liquid level sensor S1 is not in contact with the liquid, the first liquid level sensor S1 senses the permittivity of the liquid as 0% and, simultaneously, the second liquid level sensor S2 senses the permittivity of the liquid as 100%.

As described above, when the liquid level sensor 10 according to the present invention is divided into the plurality of sensors, each of which has a simplified rectangular shape, disposed in a row along the vertical direction of the liquid storage tank 40, the first liquid level sensor S1 and the second liquid level sensor S2 sense the permittivity as the same value in the liquid state and the frozen state of liquid according to the liquid level conditions 1 and 2 such that it is impossible to determine whether the liquid is frozen, and thus the frozen state of the liquid may not be accurately sensed.

On the other hand, when the liquid level sensor 10 according to the present invention is divided into a plurality of sensors, each of which has a diagonal structure, disposed in a row along the vertical direction of the liquid storage tank 40, the liquid level sensor 10 may accurately sense whether the liquid is in a frozen state.

Referring to a left drawing of FIG. 19, when the liquid level sensor 10 according to the present invention is divided into a plurality of sensors, each of which has a diagonal structure, disposed in a row along the vertical direction of the liquid storage tank 40, in a liquid level condition 1 (a state in which a first liquid level sensor S1 is not immersed into the liquid and a second liquid level sensor S2 is half-immersed in the liquid) and a state in which the liquid is not frozen, the first liquid level sensor S1 senses the permittivity of the liquid as 0% and, simultaneously, the second liquid level sensor S2 senses the permittivity of the liquid as 50%.

At this point, when the liquid level condition 1 (the state in which the first liquid level sensor S1 is not immersed into a liquid and the second liquid level sensor S2 is half-immersed in the liquid) and a state in which the liquid is frozen are satisfied, since permittivity of ice is relatively higher than that of the liquid (e.g., water), the first liquid level sensor S1 senses the permittivity of the liquid as 0% and, simultaneously, the second liquid level sensor S2 senses the permittivity of the liquid as 100%.

Further, when the liquid level sensor 10 according to the present invention is divided into a plurality of sensors, each of which has a diagonal structure, disposed in a row along the vertical direction of the liquid storage tank 40, in the liquid level condition 2 (the state in which the first liquid level sensor S1 is half-immersed into the liquid because of having the diagonal structure and the second liquid level sensor S2 is totally immersed in the liquid) and the state in which the liquid is not frozen, the first liquid level sensor S1 senses the permittivity of the liquid as about 40% and, simultaneously, the second liquid level sensor S2 senses the permittivity of the liquid as 100% (saturation of a liquid level).

At this time, when the liquid level condition 2 (the state in which the first liquid level sensor S1 is half-immersed into the liquid because of having the diagonal structure and the second liquid level sensor S2 is totally immersed in the liquid) and the liquid is frozen are satisfied, the first liquid level sensor S1 is in contact with the frozen ice to sense the permittivity of the liquid as 100% and, simultaneously, the second liquid level sensor S2 also senses the permittivity of the liquid as 100%.

As described above, when the liquid level sensor 10 according to the present invention is divided into the plurality of sensors, each of which has a diagonal structure, disposed in a row along the vertical direction of the liquid storage tank 40, the first liquid level sensor S1 and the second liquid level sensor S2 sense the permittivity as different values in the liquid state and the frozen state of the liquid according to the liquid level conditions 1 and 2 such that it is possible to determine whether the liquid is frozen, and thus the frozen state of the liquid may be accurately sensed.

Figure 20:
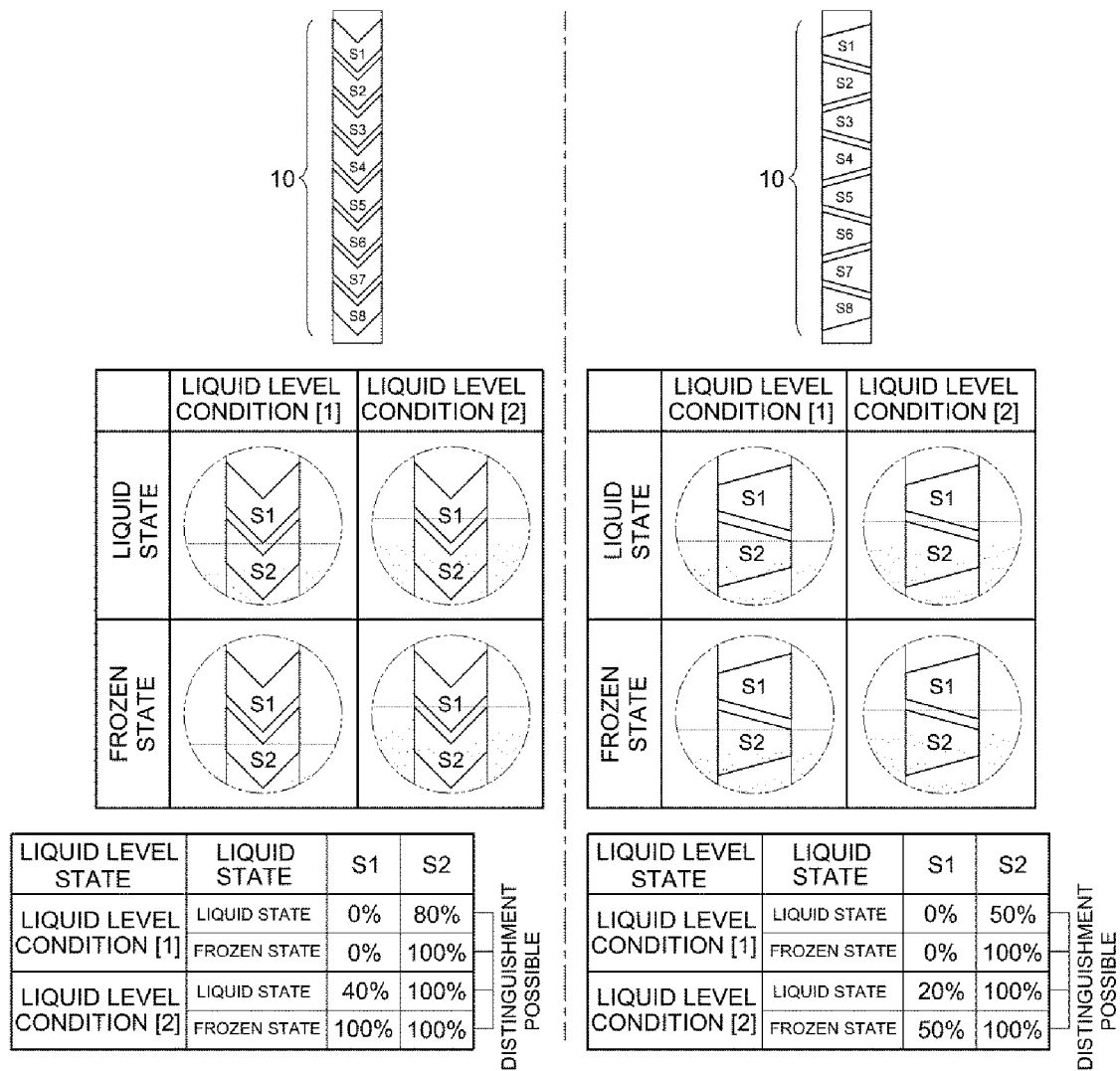

Referring to FIG. 20, even when the liquid level sensor 10 according to the present invention is divided into a plurality of sensors, each of which has a V-shaped structure, disposed in a row along the vertical direction of the liquid storage tank 40 and is divided into a plurality of sensors, each of which has a trapezoidal polygonal structure, disposed in a row along the vertical direction of the liquid storage tank 40, like the principle described with reference to the left drawing of FIG. 19, the first liquid level sensor S1 and the second liquid level sensor S2 sense the permittivity as different values in the liquid state and the frozen state of the liquid according to the liquid level conditions 1 and 2 such that it is possible to determine whether the liquid is frozen, and thus the frozen state of the liquid may be accurately sensed.

Meanwhile, it is possible to distinguish a state in which the liquid in the liquid storage tank 40 is frozen from a refueling state.

Figure 18:
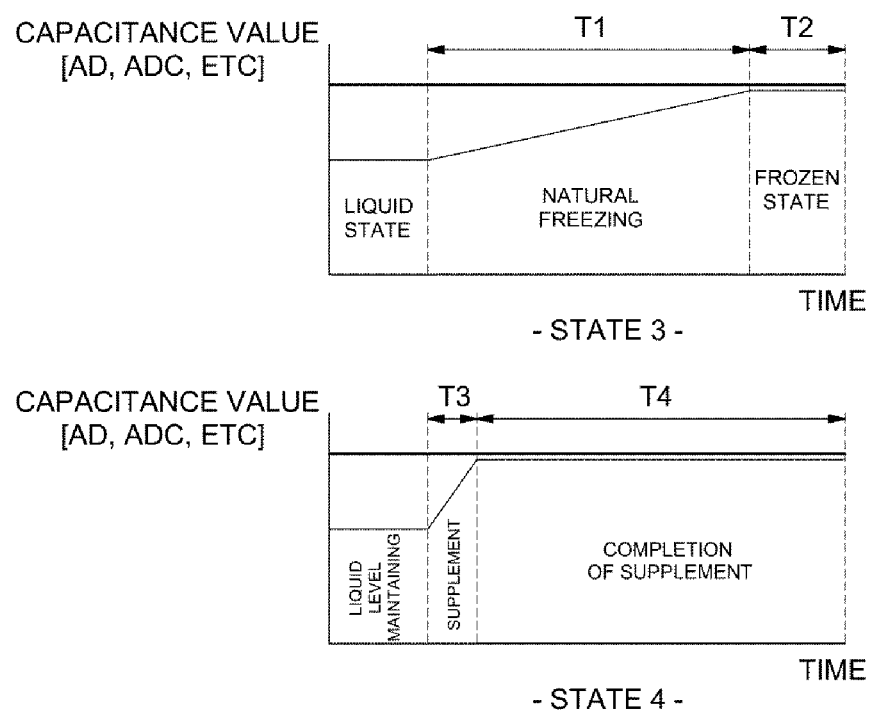
FIG. 18 is a graph showing a comparison of a freezing progress state of a liquid with a fuel supplement state.

Referring to FIG. 18, in a state in which the liquid is naturally being frozen and the refueling state, liquid levels in sections T2 and T4 may be the same.

At this point, when the liquid levels are the same, the liquid level sensor 10 is unable to determine the frozen state of the liquid, but if time of increased sensed value is additionally determined, the liquid level sensor 10 may distinguish a freezing progress state from the refueling state.

That is, when a freezing progress time T1 and a refueling time T3 are compared, since the freezing progress time T1 is a time at which fuel (liquid) is iced (frozen) as a temperature of a surrounding environment drops, it is not possible for the freezing progress time T1 to be within a short period of time (e.g., within 5 minutes), whereas it is possible for the refueling time T3 to be within a short period of time (e.g., within 5 minutes).

Accordingly, the controller 30 may determine whether the fuel is in the ice (freezing) progress state or the refueling state by analyzing a rise time difference (difference between T1 and T3) in sensed value of the liquid level sensor 10.

Hereinafter, an example of operation control for the device for monitoring a liquid level according to the present invention will be described.

Figure 15:
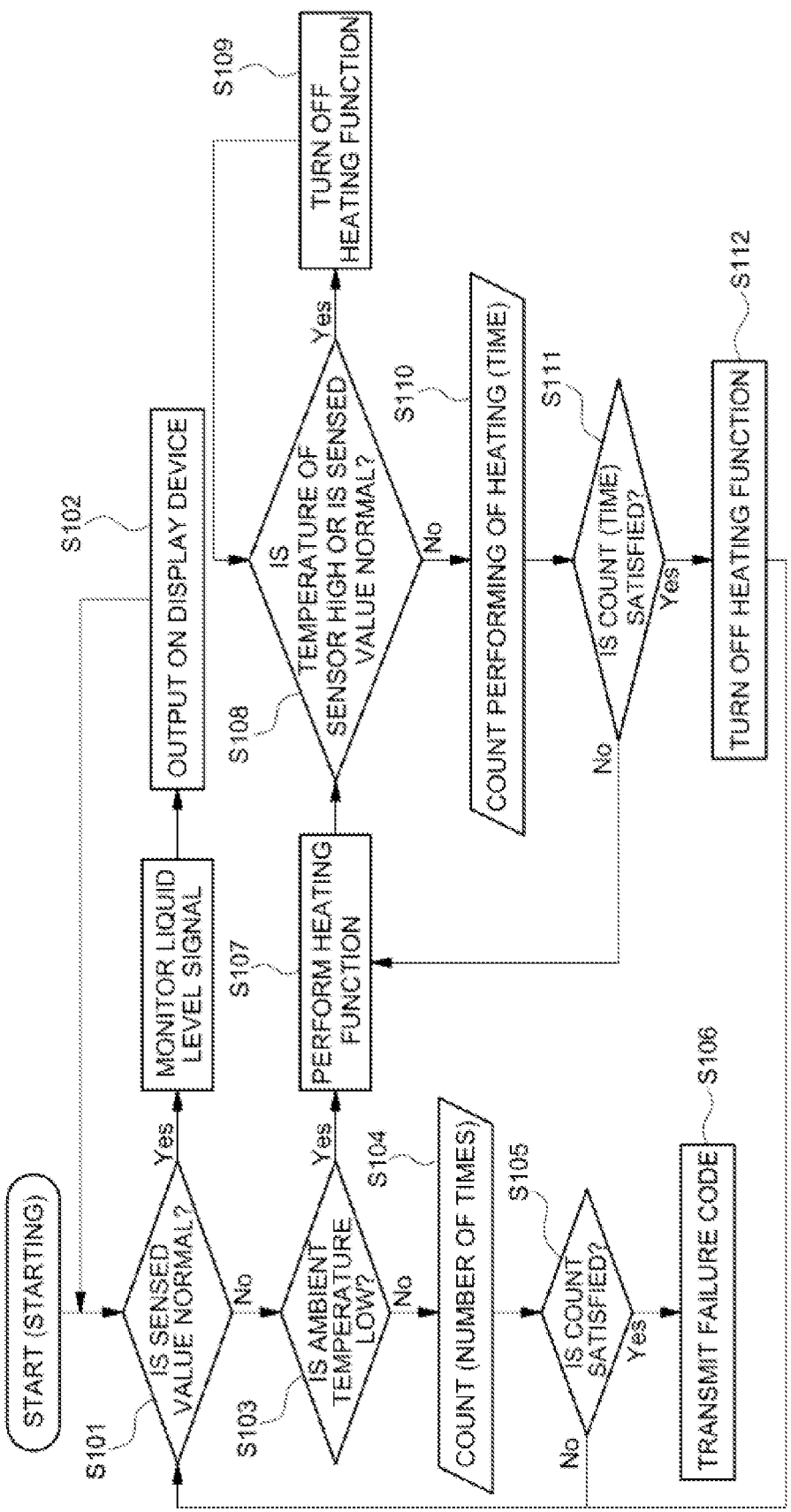
FIG. 15 is a flowchart illustrating an example of operation control for the device for monitoring a liquid level of the present invention.

FIG. 15 is a flowchart illustrating an example of operation control for the device for monitoring a liquid level of the present invention.

First, the controller 30 determines whether a sensed value (permittivity) sensed by the liquid level sensor 10 is a normal value or an abnormal value (S101).

That is, the controller 30 determines whether the sensed value sensed by the liquid level sensor 10 is a normal value for sensing a liquid level of the liquid in a liquid state or an abnormal value for sensing the liquid level of the liquid in a frozen state.

For example, as described above, when the liquid level sensor 10 according to the present invention is divided into a plurality of sensors, each of which has a diagonal structure, disposed in a row along the vertical direction of the liquid storage tank 40, in the liquid level condition 1 (the state in which the first liquid level sensor S1 is not immersed into the liquid and the second liquid level sensor S2 is half-immersed in the liquid) and the state in which the liquid is not frozen, when the first liquid level sensor S1 senses the permittivity of the liquid as 0% and, simultaneously, the second liquid level sensor S2 senses the permittivity of the liquid as 50%, the controller 30 determines the sensed value (permittivity) sensed by the liquid level sensor 10 as being the normal value.

On the other hand, as described above, when the liquid level sensor 10 according to the present invention is divided into a plurality of sensors, each of which has a diagonal structure, disposed in a row along the vertical direction of the liquid storage tank 40, in the liquid level condition 1 (the state in which the first liquid level sensor S1 is not immersed into the liquid and the second liquid level sensor S2 is half-immersed in the liquid) and the state in which the liquid is frozen, since permittivity of ice is relatively higher than that of the liquid (e.g., water), when the first liquid level sensor S1 senses the permittivity of the liquid as 0% and, simultaneously, the second liquid level sensor S2 senses the permittivity of the liquid as 100%, the controller 30 determines the sensed value (permittivity) sensed by the liquid level sensor 10 as being the abnormal value.

At this point, when the sensed value (permittivity) sensed by the liquid level sensor 10 is determined as being the normal value, the controller 30 outputs the sensed value, which is determined as being the normal value, as a liquid level monitoring signal, i.e., a signal which is displayable on the display device 31 or the like (S102).

On the other hand, when the sensed value (permittivity) sensed by the liquid level sensor 10 is determined as being the abnormal value, the controller 30 performs a heating function of resolving a freezing of the liquid, and at this point, the performing of the heating function is carried out by driving the heating device 32 in response to a control signal.

Preferably, before performing the heating function, the controller 30 determines whether a current ambient temperature received from the ambient temperature sensor 33 is a low temperature sufficient to cause freezing of the liquid (S103), and this is because of verifying a sensing error for which the liquid level sensor 10 outputs an abnormal value even though the current ambient temperature is not sufficient to cause the freezing of the liquid.

More preferably, before performing the heating function, the controller 30 counts the number of times that the current ambient temperature received from the ambient temperature sensor 33 is determined as being a high temperature insufficient to cause the freezing of the liquid (S104), and when the counted number is greater than or equal to a reference value (i.e., a reference number of reference times) (S105), the controller 30 outputs a failure code of the liquid level sensor 10 (S106).

When the current ambient temperature is determined as being the low temperature sufficient to cause the freezing of the liquid in operation S103, the heating function of resolving the freezing of the liquid is performed (S107), and at this point, the heating function is carried out by transmitting a driving signal from the controller 30 to the heating device 32.

For example, when the frozen liquid is a washer liquid, the washer nozzle heater 32-1 installed at a washer nozzle, the heater 32-2 installed at a hose through which the washer liquid flows, and the reservoir heater 32-3 installed at a reservoir in which the washer liquid is stored are driven as the heater device 32 such that the liquid (e.g., the washer liquid) may easily be melted.

Meanwhile, after the heater device 32 is driven, when the sensed value (permittivity) sensed by the liquid level sensor 10 is determined as being the normal value or the liquid level sensor 10 separately measures a temperature and the measured temperature is determined as being greater than or equal to a reference temperature (S108), the controller 30 interrupts the driving of the heating device 32 (S109).

Alternatively, the controller 30 counts a driving time of the heater device 32 (S110), and when the counted driving time satisfies a reference count (S111), the controller 30 interrupts the driving of the heating device 32 (S112).

Alternatively, the liquid level sensor 10 according to the present invention may directly generate heat to resolve the frozen state of the liquid.

That is, as described above, when the frozen state of the liquid is determined, the liquid may be melted to be in a usable state through the driving of the heating device 32, but the liquid level sensor 10 may directly generate heat to resolve the frozen state of the liquid more easily.

Figure 21:
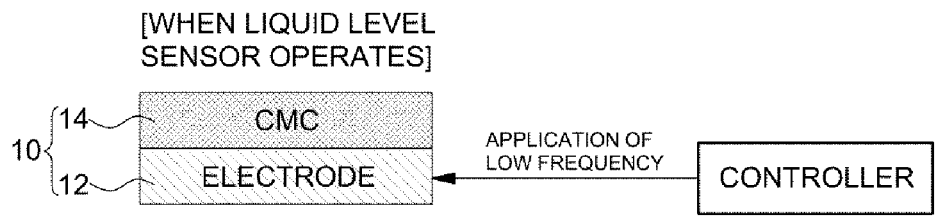
FIGS. 21 to 23 are schematic diagrams illustrating the principle that a carbon micro coil (CMC) of the liquid level sensor according to the present invention generates heat by applying a high frequency to the liquid level sensor.

To this end, referring to FIG. 21, the controller 30 applies a high frequency to the electrode 12 of the liquid level sensor 10 together with the driving of the heating device 32, and when the liquid level sensor 10 performs a sensing operation, the controller 30 applies a low frequency and applies the high frequency only when the heating function is required.

Figure 23:
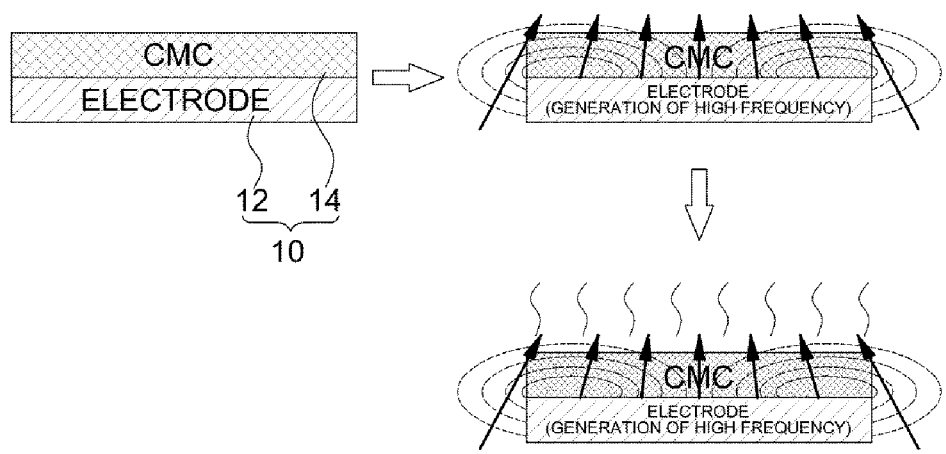

In this case, as shown in FIG. 23, the CMC 16 included in the electromotive force amplification layer 14 of the liquid level sensor 10 has a feature of absorbing the high frequency, converting the absorbed high frequency into thermal energy, and generating heat while simultaneously radiating the thermal energy to the outside.

Figure 22:
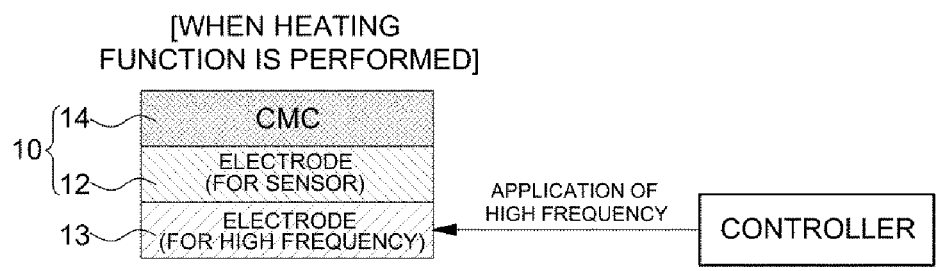

Preferably, as shown in FIG. 22, in addition to the electrode 12 constituting the liquid level sensor 10, a high frequency electrode 13 is additionally stacked on and attached to the electrode 12 to directly generate a high frequency such that the CMC 16 contained in the electromotive force amplification layer 14 may absorb the high frequency more easily to convert the absorbed high frequency into thermal energy.

Therefore, the liquid level sensor 10 according to the present invention may directly generate heat by the high frequency, thereby resolving the freezing of the liquid more easily.

The present invention provides the following effects through the above-described problem solving means.

First, a liquid level sensor is improved by a structure having an electromotive force amplification layer including an electrode and a carbon micro coil (CMC) such that sensing sensitivity of the liquid level sensor can be improved.

Second, a paste of the electromotive force amplification layer performs an electrode protection function of preventing a liquid from being brought into contact with the electrode, thereby preventing oxidation caused by a direct contact of the electrode with the liquid such that the lifetime of the electrode can be prolonged.

Third, the liquid level sensor can accurately sense the frozen state of the liquid to induce heating for resolving a freezing of the liquid such that the freezing of the liquid filled in various liquid storage tanks of a vehicle can be prevented.

As described above, a liquid level sensor according to the present invention amplifies an electromotive force generated by an electrode at an electromotive force amplification layer including a CMC such that sensing sensitivity can be improved as well as whether a liquid is frozen can be determined and, simultaneously, a frozen state of the liquid can be accurately sensed to resolve the frozen state of the liquid.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for monitoring a liquid level of a liquid storage tank for a vehicle, the method comprising:
   sensing, by a liquid level sensor in which an electromotive force amplification layer is coated on one surface of an electrode, the liquid level of a liquid in a state in which the liquid level sensor is installed inside or outside the liquid storage tank;
   determining whether a sensed value sensed by the liquid level sensor is a normal value for sensing the liquid level of the liquid or an abnormal value for sensing the liquid level of the liquid,
   wherein:
     the sensed value is the normal value when the liquid is in a liquid state,
     the sensed value is the abnormal value when the liquid is in a frozen state, and
     the liquid level sensor determines the normal value and the abnormal value based on a difference in permittivity between liquid and ice;
   when the sensed value sensed by the liquid level sensor is determined as being the abnormal value, driving, by a controller, a heating device for resolving a freezing of the liquid; and
   when the sensed value sensed by the liquid level sensor is determined as being the normal value after the driving of the heating device, interrupting the driving of the heating device.

2. The method of claim 1, further comprising:
   before the driving of the heating device, determining, by the controller, whether a current ambient temperature received from an ambient temperature sensor is a low temperature sufficient to cause the freezing of the liquid.

3. The method of claim 2, further comprising:
   counting, by the controller, the number of times that the current ambient temperature received from the ambient temperature sensor is determined as being a high temperature insufficient to cause the freezing of the liquid; and
   when the counted number of count times is greater than or equal to a reference value, outputting a failure code of the liquid level sensor.

4. The method of claim 1, further comprising:
   before the interrupting of the driving of the heating device, applying, by the controller, a high frequency to the electrode of the liquid level sensor.

5. The method of claim 4, further comprising:
   when the high frequency is applied, absorbing, by a carbon micro coil (CMC) included in the electromotive force amplification layer of the liquid level sensor, the high frequency, converting the absorbed high frequency into thermal energy, and generating heat.

* * * * *